US012614406B2

(12) United States Patent　　(10) Patent No.: US 12,614,406 B2
Pribble et al.　　(45) Date of Patent: Apr. 28, 2026

(54) SYSTEMS AND METHODS FOR APPLYING SCALE FACTORS TO IMAGE OBJECTS

(71) Applicant: Capital One Services, LLC, McLean, VA (US)

(72) Inventors: Jason Pribble, McLean, VA (US); Swapnil Patil, Chantilly, VA (US); Natalie Siejczuk, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 348 days.

(21) Appl. No.: 18/350,715

(22) Filed: Jul. 11, 2023

(65) Prior Publication Data

US 2025/0022302 A1　　Jan. 16, 2025

(51) Int. Cl.
| | |
|---|---|
| *G06V 30/413* | (2022.01) |
| *G06T 3/60* | (2024.01) |
| *G06T 5/20* | (2006.01) |
| *G06T 5/80* | (2024.01) |
| *G06T 7/00* | (2017.01) |
| *G06T 7/13* | (2017.01) |
| *G06T 7/60* | (2017.01) |
| *G06V 10/44* | (2022.01) |
| *G06V 10/77* | (2022.01) |
| *G06V 10/94* | (2022.01) |
| *G06V 20/62* | (2022.01) |

(52) U.S. Cl.
CPC .............. *G06V 30/413* (2022.01); *G06T 3/60* (2013.01); *G06T 5/20* (2013.01); *G06T 5/80* (2024.01); *G06T 7/0002* (2013.01); *G06T 7/13* (2017.01); *G06T 7/60* (2013.01); *G06V 10/44* (2022.01); *G06V 10/77* (2022.01); *G06V*

*10/945* (2022.01); *G06V 20/62* (2022.01); *G06T 2207/20081* (2013.01); *G06T 2207/20092* (2013.01); *G06T 2207/30176* (2013.01)

(58) Field of Classification Search
CPC ...... G06V 30/413; G06V 10/77; G06V 20/62; G06V 10/44; G06V 10/945; G06T 7/13; G06T 5/80; G06T 3/60; G06T 5/20; G06T 7/0002; G06T 7/60; G06T 2207/20081; G06T 2207/20092; G06T 2207/30176
See application file for complete search history.

(56) References Cited

U.S. PATENT DOCUMENTS

| | | | | |
|---|---|---|---|---|
| 9,729,755 | B2 * | 8/2017 | Stuart | ................ H04N 1/00082 |
| 2009/0141992 | A1 * | 6/2009 | Coulombe | ............. H04N 19/40 |
| | | | | 382/238 |
| 2013/0127915 | A1 * | 5/2013 | Gilra | .................... H04N 1/3875 |
| | | | | 345/660 |
| 2022/0375113 | A1 * | 11/2022 | Sosnovik | .................. G06T 7/60 |
| 2023/0005140 | A1 * | 1/2023 | Ferl | ...................... G06V 10/774 |

* cited by examiner

*Primary Examiner* — Gregory A Morse
*Assistant Examiner* — Rohan Tejas Mukundhan
(74) *Attorney, Agent, or Firm* — Foley & Lardner LLP

(57) ABSTRACT

Methods and systems are described herein for applying padding (e.g., a scale factor) to a detected object (e.g., a rotated rectangle or other shape) in an image before rotation correction is applied. By applying the padding prior to the rotation correction, the system is more efficient as rotation correction may be performed simultaneously with other processing tasks such as cropping and downscaling. For example, by applying padding first, the system is able to keep rotation correction, cropping, and/or downscaling as a single step, which is quicker and more efficient.

20 Claims, 6 Drawing Sheets

Figure 2:
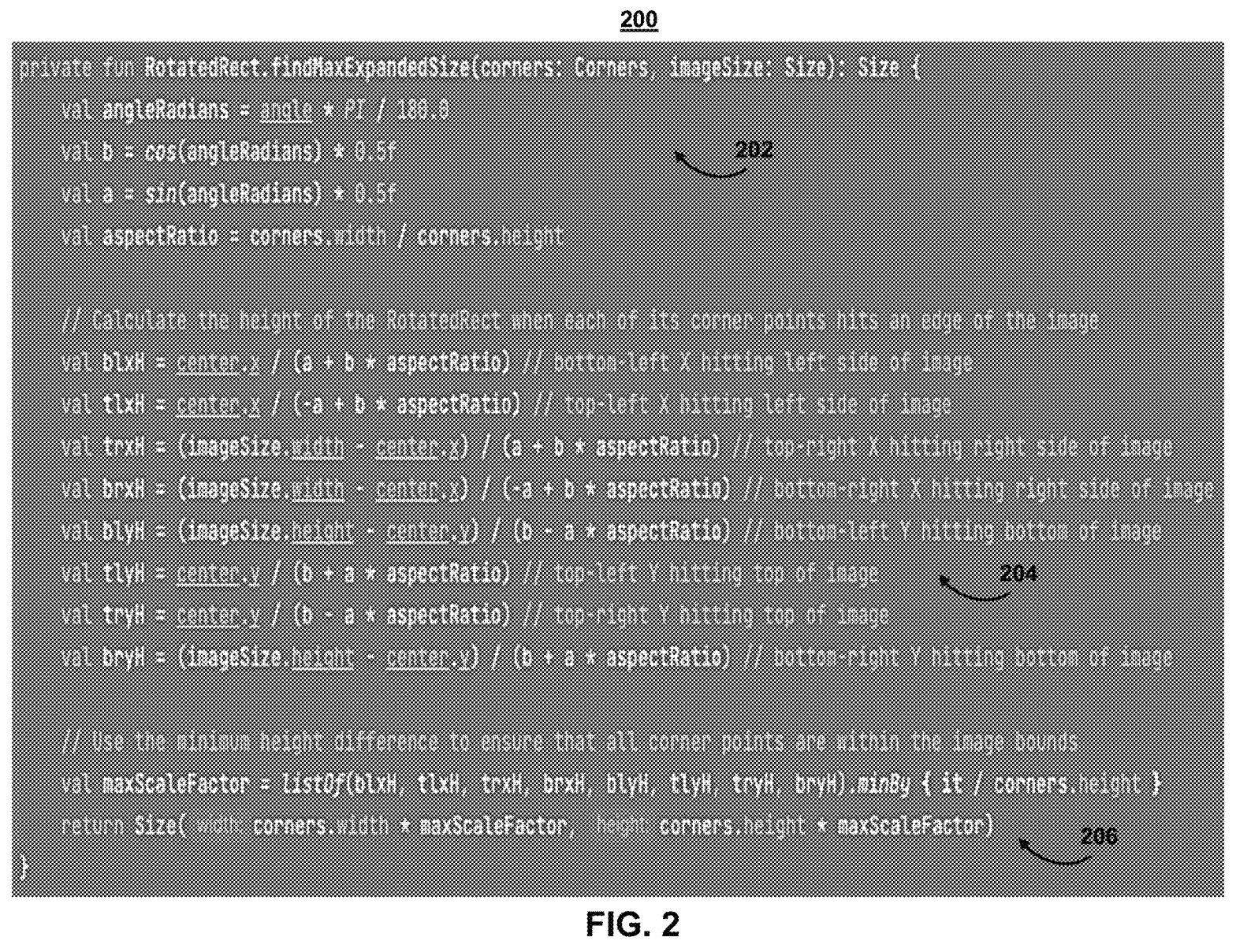

200

```
RotatedRect findMaxExpandedSize(corners: Corners, imageSize: Size): Size { angleRadians = angle * PI / 180 b = cos(angleRadians) * 0.5f
    a = sin(angleRadians) * 0.5f aspectRatio = corners.width / corners.height
```

Receive an image

402

Generate a model input

404

Receive an output

406

Determine, based on the output, a scale factor

408

Perform an image processing task based on the scale factor

410

SYSTEMS AND METHODS FOR APPLYING SCALE FACTORS TO IMAGE OBJECTS

BACKGROUND

In recent years, the use of artificial intelligence, including, but not limited to, machine learning, deep learning, etc. (referred to collectively herein as artificial intelligence models, machine learning models, or simply models), has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring its high quality is often complex and time-consuming. Second, despite the mainstream popularity of artificial intelligence, specialized knowledge is required to design, program, and integrate artificial intelligence-based solutions, which limits the amount of people and resources available to create practical implementations of artificial intelligence. Finally, results based on artificial intelligence are notoriously difficult to review as the process by which the results are generated may be unknown or obscured. This obscurity creates hurdles for identifying errors in the results as well as improving the models providing the results. These technical problems present inherent challenges with attempting to use an artificial intelligence-based solution in automatically detecting objects in client communications.

SUMMARY

Methods and systems are described herein for novel uses of and/or improvements to artificial intelligence applications. As one example, methods and systems are described herein for using artificial intelligence for text extraction. In particular, the methods and systems relate to identifying objects in images during a document liveness check.

For example, when capturing images of an object (e.g., a government-issued form of identification (ID)) for identity verification, a system may need to crop the object out of the image with some percent of padding around the object in order to enhance document liveness detection. A document liveness check verifies that the image is from a physical object and not an image of an image. The check functions better when some background around the object is included in the image. When adding padding around the rotated object in the image, the system also needs to maintain the object's aspect ratio and stay within the bounds of the image so that the object is displayed properly on a user interface.

Conventional image padding would be performed after rotation correction. However, the system uses a novel algorithm that allows the system to apply padding (e.g., a scale factor) to the detected object (e.g., a rotated rectangle or other shape) in the image before rotation correction is applied. By applying the padding prior to the rotation correction, the system is more efficient as rotation correction may be performed simultaneously with other processing tasks such as cropping and downscaling. For example, by applying padding first, the system is able to keep rotation correction, cropping, and/or downscaling as a single step, which is quicker and more efficient.

To allow for applying scale factors to image objects received as part of user communications before correcting rotations of the image objects, the system calculates a maximum scale factor (e.g., padding) that a rotated rectangle about the object can expand while maintaining its aspect ratio before one of its corners encounters an edge of a portion of the image. To determine the scale factor, the system detects a rotated rectangle for an object. The system also determines a center point for the object. The system may also determine a current rotation angle (if any) as well as a size (e.g., width/height) of the object. The system may then determine the size and/or bounds of a portion of the image corresponding to the object (e.g., the portion in which the object is rotated). The system may then use the bounds (e.g., width/height) of the portion to calculate a percent change in the rotated rectangle's size (e.g., a "deltaSize") required for each of the X/Y coordinates of the corner points of the object to reach the boundary of the portion.

The system may then calculate the deltaSize for the X/Y coordinates of the four corner points. The system may then select the minimum deltaSize value as the maximum scale factor that ensures all four corner points are within the portion's bounds. When applying padding to the object, the system may select the scale factor (e.g., padding) to be less than or equal to the maximum scale factor.

In some aspects, methods and systems are described herein for applying scale factors to image objects received as part of user communications before correcting rotations of the image objects. For example, the system may receive, from a first user, a first user communication comprising a first image, wherein the first image comprises a first object within a first portion of the first image. The system may generate a first model input based on the first user communication. The system may input the first model input into a first model to receive a first output, wherein the first model is trained to determine respective scale factors, prior to applying rotation correction, for objects of inputted images in portions of the inputted images. The system may determine, based on the first output, a first scale factor for the first object, wherein the first scale factor comprises a maximum expansion of the first object while maintaining a first aspect ratio before a first corner point of a plurality of corner points of the first object corresponds to a first edge of a plurality of edges of the first portion. The system may, in response to determining the first scale factor, perform a first image processing task on the first image based on the first scale factor.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 2 shows an illustrative diagram of pseudocode for optimizing images before correcting rotations of the image objects, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1A:
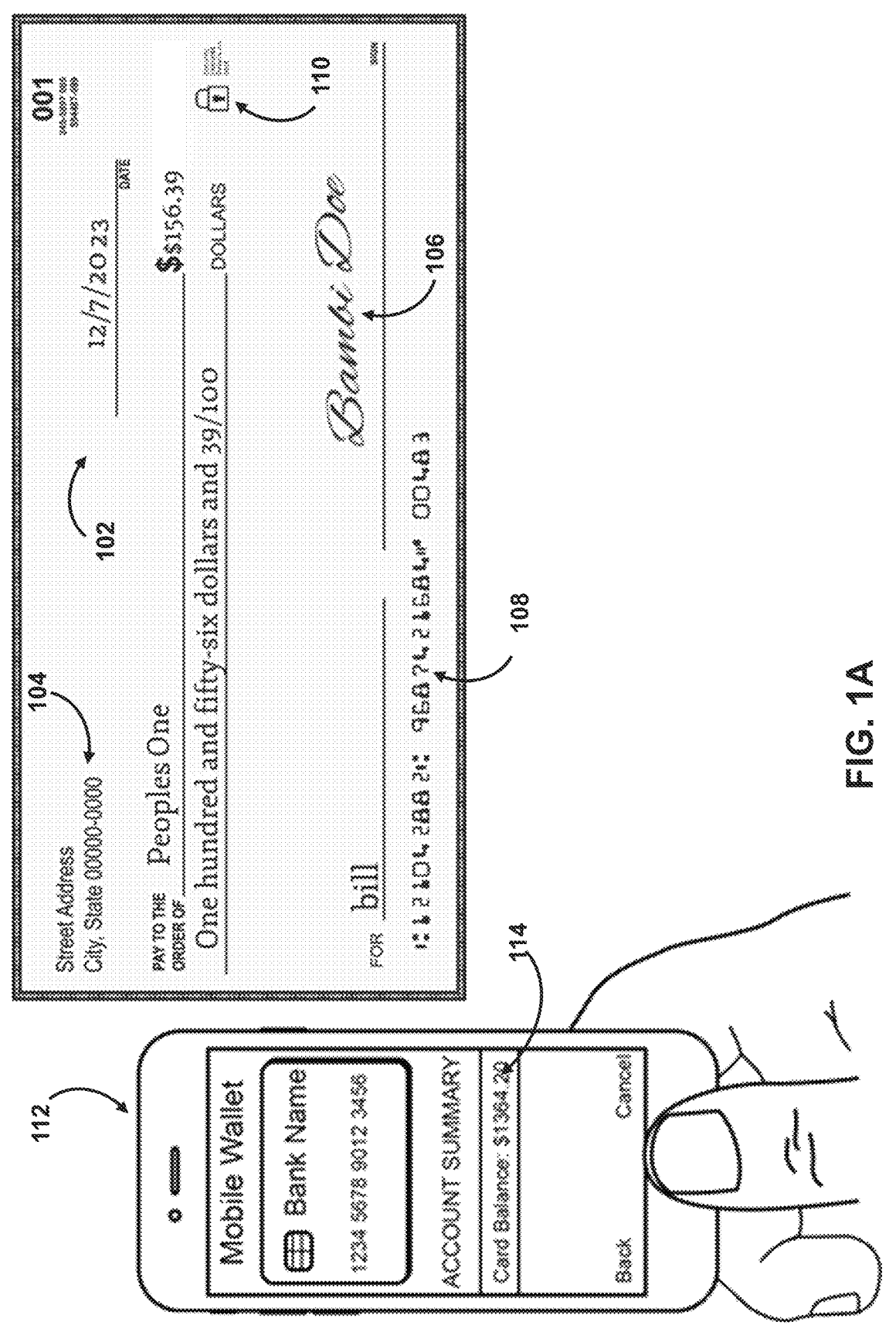
FIGS. 1A-C show illustrative diagrams for optimizing images before correcting rotations of the image objects, in accordance with one or more embodiments.
Figure 1B:
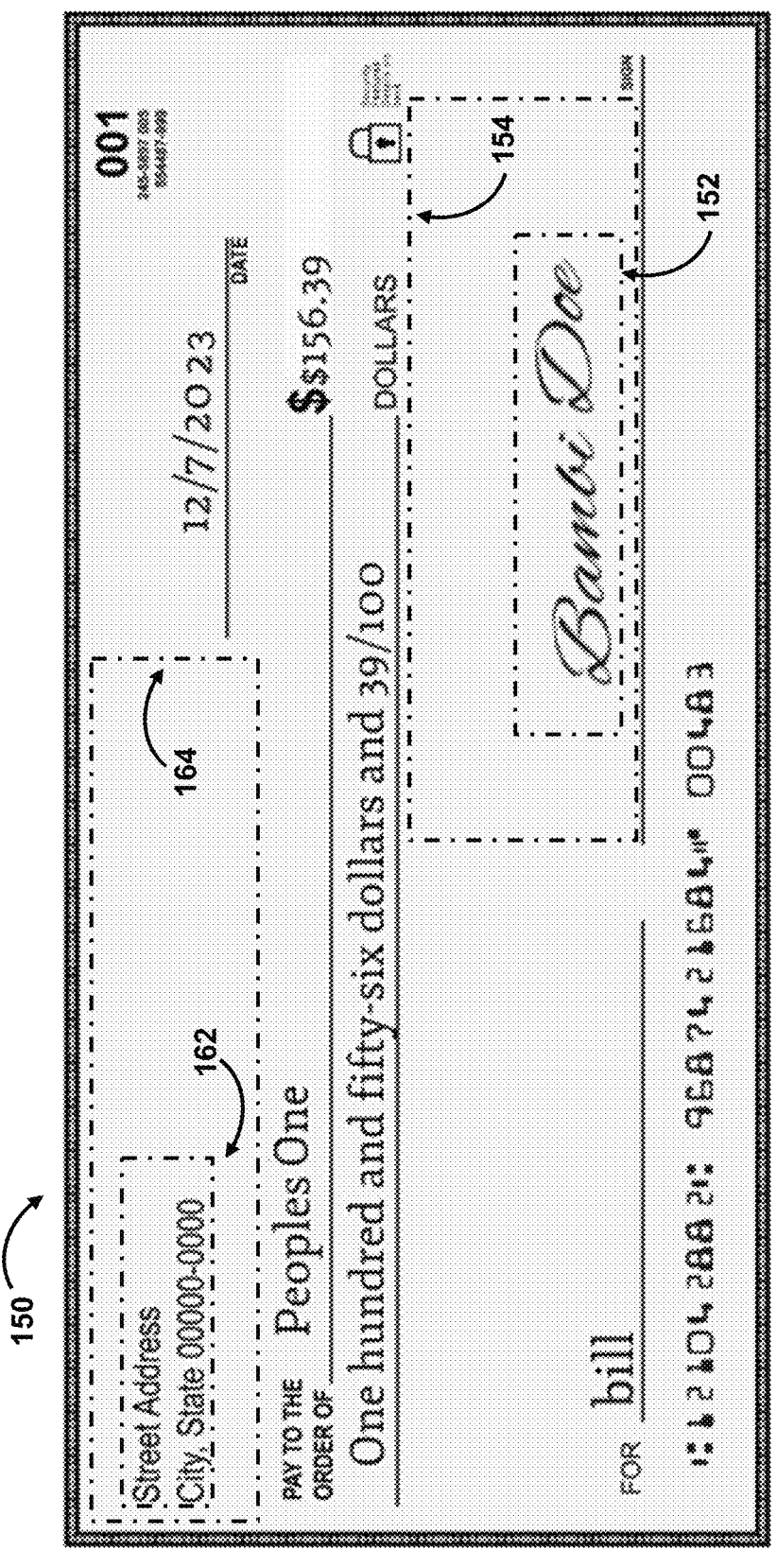
Figure 1C:
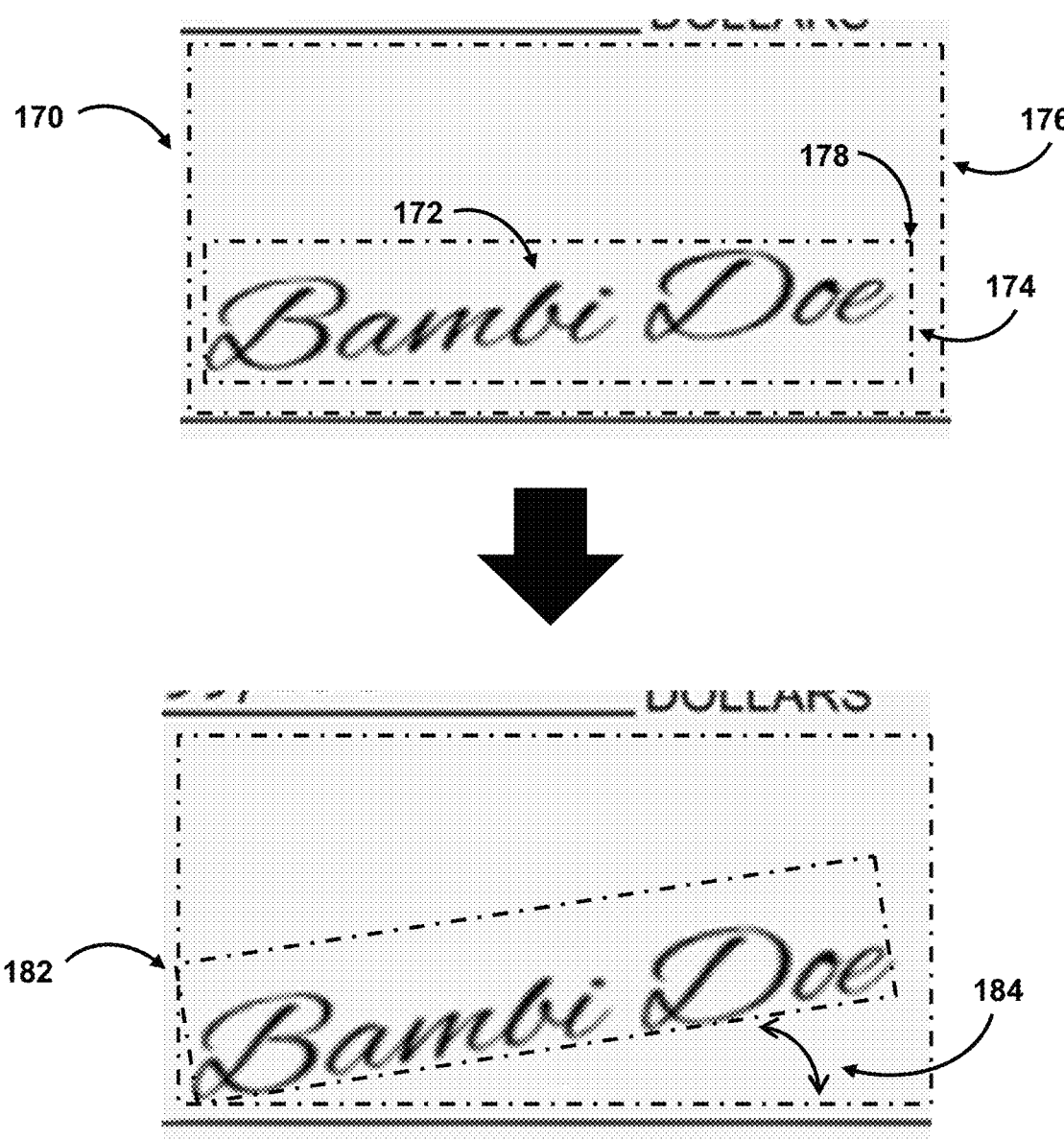

FIGS. 1A-C show illustrative diagrams for optimizing images before correcting rotations of the image objects, in accordance with one or more embodiments. For example, FIG. 1A shows a device (e.g., smartphone 112) capturing an image with its camera (and/or other content capture device) and passing the image into a user interface (user interface 114) of the device (e.g., a mobile application and/or messaging application). The system may receive such communications, which may include images, from users. As referred to herein, a "user interface" may comprise a human-computer interaction and communication in a device, and it may include display screens, keyboards, a mouse, and the appearance of a desktop. For example, a user interface may comprise a way a user interacts with an application or a website.

The system may also process images received in the ways described below. For example, the system may use one or more artificial intelligence models (including models, neural networks, etc.). The system may use any number of methods, including, but not limited to, neural networks or convolutional neural networks (CNNs) to learn to process images and/or other content.

As referred to herein, "content" should be understood to mean an electronically consumable user asset, such as television programming, as well as pay-per-view programs, on-demand programs (as in video-on-demand (VOD) systems), Internet content (e.g., streaming content, downloadable content, webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be based on physical content, which may include user assets that are not electronically consumable such as documents or other physical material.

In some embodiments, content may be transmitted to a system via a user communication. As referred to herein, a "user communication" may comprise any content transmitted by a user to the system. For example, a user communication may comprise content such as a document, check, government-issued ID, etc. that may be analyzed by one or more systems to detect and/or determine objects within the content.

User communications, in particular images, may comprise one or more portions. As referred to herein, a "portion" may comprise any of the more or less distinct parts into which the content may be divided or from which the content is made up. For example, a portion may be distinguished from another portion by one or more identifying characteristics. In FIG. 1A, portion 104 is a portion of image 102, which comprises a document (e.g., a check). Portion 104 corresponds to a header of the check, which features textual information. Textual information may refer to any alphanumeric information in a picture or photograph. Image 102 comprises numerous other portions. For example, portion 106 contains handwritten text, portion 108 contains a typed account number, and portion 110 contains a graphic. A graphic may comprise non-textual information, which can include graphs, shapes, and any portion not consisting of non-alphanumeric characters. The portions may be distinguished from each other based on identifying characteristics.

As referred to herein, an "identifying characteristic" may comprise any characteristic that distinguishes one portion of a communication from another. An identifying characteristic may be media-related information (e.g., ordering, heading information, titles, descriptions, genre or category information, subject matter information, author/actor information, logo data, or other identifiers for the content provider), media format, file type, object type, objects appearing in the content (e.g., product placements, advertisements, keywords, context), or any other suitable information used to distinguish one portion from another. For example, an identifying characteristic could be the pixel location of an image, the figures or shapes contained within the image, a keyword contained in the text of an image, or any other part of a readable image. For example, a grayscale ratio, which is a type of data about the brightness and contrast of an image, could be an identifying characteristic. In FIG. 1, component 104 is a portion and its location and text constitute identifying characteristics.

In some embodiments, the identifying characteristics may comprise one or more objects and/or characteristics thereof. For example, the object may comprise a discrete and tangible thing that exists in the physical world and can be perceived by the senses. Objects can have different properties, such as size, shape, color, texture, and weight, which distinguish them from one another. In some embodiments, an object may be a computer object, which may comprise a specific instance of a class, which is a blueprint or template defining the characteristics and behaviors of a particular type of object.

In some embodiments (e.g., in the context of image processing and computer vision), an object in an image (e.g., a user communication) may refer to a specific entity or region of interest that is distinguishable from its surroundings. The object may represent a meaningful and coherent part of the visual content within the image.

Objects in images can vary in size, shape, color, texture, and/or other identifying characteristics. They can be everyday objects like cars, buildings, or animals, or they can represent more abstract concepts like lines, curves, or patterns. The recognition and identification of objects in images are fundamental tasks in computer vision, with numerous applications such as object detection, object tracking, and image classification.

To detect objects in an image, the system may utilize various computer vision techniques, including image segmentation, feature extraction, and pattern recognition. These methods aim to analyze the visual information in the image and identify regions or regions of interest that correspond to different objects. In particular, the system may use object detection algorithms and frameworks, such as Faster R-CNN, YOLO (You Only Look Once), and SSD (Single Shot MultiBox Detector), to automate the process of identifying and localizing objects in images, enabling applications like autonomous driving, surveillance, and image-based search.

The system may use one or more identifying characteristics to distinguish between different types of content and/or portions of content (e.g., graphic, handwritten, and/or printed content), in accordance with one or more embodiments. For example, as shown in FIG. 1, the system may receive an image or a portion of an image (e.g., image 102). Image 102 may comprise an image comprising multiple types of content (e.g., handwritten content 106, textual content 108, and graphic content 110). The system may then determine whether a portion of image 102 is of a particular type of content and/or attribute an importance metric to that portion. For example, the system may comprise a supervised image pattern recognition model that detects types of content (e.g., handwritten content 106, textual content 108, and graphic content 110). For example, the system may automatically recognize patterns and regularities in image 102 based on similar patterns in similar-sized portions. The system may analyze image 102 to determine the placement and intensities of pixels in image 102. For example, the system may, for each extracted unit, generate a small-size image (e.g., in order to preserve processing power) and determine the pixel intensities in this image to use as mathematical representations. The mathematical representations express the shape characteristics of the unit, which can be used to distinguish one type of content from another.

The system may then determine whether different portions of image 102 correspond to different types of content. For example, the system may be trained from labeled training data (e.g., a dataset of scanned images containing different types of content). For example, the system may provide an assignment of a label (e.g., handwritten, graphic, or textual content) based on a series of values based on pixel data corresponding to a portion of image 102.

In some embodiments, the system may use statistical inference to determine the best label for a given instance (e.g., portion 104). For example, the system may comprise a classifier algorithm that provides an assignment of a label (e.g., handwritten, graphic, or printed content). Alternatively or additionally, the system may be a probabilistic classifier that provides an output probability of the instance being described by the given label.

The system may generate a content map for a portion, wherein the content map indicates a position of the identifying characteristic in the portion. For example, the content map may include each identifying characteristic of a given portion with the distances and/or positions indicated. For example, the system may determine the location of text within an image. The content map may define the bounds of the image as well as distinct portions within the image.

The system may determine an image type based on its content maps. For example, the system may identify that image 102 is a bank check from a content map indicating a bank logo, a routing number line, and other identifying characteristics. In some embodiments, the system may retrieve a template for the image based on its image type, wherein the template comprises an arrangement of preset standard content maps. For example, the system may compare the image's content maps against the template to identify missing information.

The system may also determine an error type based on an image, content map, etc. An error type may, for example, be an ink blot on an image and/or other defect that results in the system performing a corrective action. For example, a corrective action may comprise an image processing task that is used to generate a processed image (e.g., a processed image that accounts for the defect of the error type).

An image processing task may be any task related to image manipulation, analysis, and computer vision applications. For example, a processing task may involve reading and loading images from various file formats, such as JPEG, PNG, BMP, etc. In another example, the processing task may comprise a range of filtering operations, including blurring, sharpening, noise reduction, and edge detection. These operations help to enhance image quality or extract specific features. In another example, the processing task may comprise various geometric transformations like scaling, rotation, translation, and perspective transformation. These transformations are useful for tasks such as image registration, alignment, and augmentation. In another example, the processing task may comprise functions for automatic or manual thresholding, allowing the system to convert grayscale images to binary images based on specific intensity thresholds. In another example, the processing task may comprise algorithms for detecting and extracting features, such as corners, edges, blobs, or keypoints, in images. These features are often used for tasks like object recognition, tracking, and matching. In another example, the processing task may comprise segmenting images into meaningful regions or objects (e.g., via thresholding, contour detection, and clustering algorithms like k-means or watershed). In another example, the processing task may comprise integrating with machine learning libraries, such as scikit-learn or TensorFlow, enabling the training and application of image classification or object recognition models. The system can extract image features, train classifiers, and perform inference on new images. In another example, the processing task may comprise a wide range of geometric and projective transformations, enabling operations like image warping, perspective correction, and image stitching. As referred to herein, "stitching" several images may comprise taking one or more portions from each image and combining them into a product image, using a model and/or any other suitable method. This method may be particularly helpful where there are multiple images with the same subject matter received as part of the same user communication. One or more images may assist the system in identifying an image type and thus retrieving a template, and the sharp portions of one or more images may be used to remedy other blurry portions.

In another example, an error type could be horizontal movement of the camera when the picture was taken. The system may then determine whether a given portion needs an image processing task performed on an object based on an identifying characteristic. The system may make this determination based on a type of content in a given portion. The system may use a multitude of methods to identify a characteristic, including the Fast Fourier Transform, the Haar Wavelet Transform, and the Laplacian Operator. The system may select which of the methods to use based on an initial calculation of what data is available and/or the quality of the data. For example, in response to receiving a model input, a model may determine what data is available and/or what methods of analysis to use. For example, the first model may be trained to determine respective scale factors, prior to applying rotation correction, for objects of inputted images in portions of the inputted images. The model may be further trained to pre-process the model input to determine what data is available and/or what method (or methods) of characteristic detection should be used.

For example, the Fast Fourier Transform method calculates the frequencies in an image at different points and compares the frequencies against a predetermined benchmark to decide whether the image is blurred or sharp. When the frequency is low compared to the benchmark, the system declares that the image is blurred (e.g., has a given characteristic). As such, the system may select the Fast Fourier Transform method (or an algorithm that uses the Fast Fourier Transform method) in response to detecting different points and/or frequencies in the image. The system may select the Fast Fourier Transform method as the Fast Fourier Transform method uses algorithms that have errors when finite-precision floating-point arithmetic is used, but these errors are typically quite small. Furthermore, the algorithms used by the Fast Fourier Transform method have excellent numerical properties as a consequence of the pairwise summation structure of the algorithms, thus leading to high accuracy.

The Haar Wavelet Transform method examines the edge types within an image to determine whether the image has a characteristic, and subsequently examines the edge sharpness to estimate the extent of the edge. Edges within images fall into the categories of the Dirac structure, Astep structure, Gstep structure, and Roof structure. Blurred images contain less Dirac structure and Astep structure. The system can therefore compute the proportions of the Dirac and Astep structures to infer whether an image has a characteristic. As such, the system may select the Haar Wavelet Transform method (or an algorithm that uses the Haar Wavelet Transform method) in response to detecting (e.g., with a high degree of accuracy) edge types and/or sharpness. The system may select the Haar Wavelet Transform method as the Haar Wavelet Transform method is effective in applications such as signal and image compression as it provides a simple and computationally efficient approach for analyzing the local aspects of a signal. As such, the Haar Wavelet Transform method may be particularly effective when computational resources are low, such as when a mobile device is used to process an image and/or run a model.

The Laplacian Operator involves overlaying a convolution matrix onto an image to find areas of rapid changes in images. A Laplacian Operator is a second derivative of a multivariate function. In this case, to apply a Laplacian Operator to the pixel locations would result in a matrix of numerical multipliers, also known as a convolution. The image is multiplied with the convolution matrix. The closer the product is to 0, the more uniform an image is, which indicates a greater probability of the image having a particular characteristic. The system may select the Laplacian Operator method as the Laplacian Operator method is effective in applications in which boundaries and/or edges are not well defined. For example, the Laplacian operator is isotropic; thus, it has the same properties in each direction.

For example, in cases where the error is caused by camera movement when the picture was taken, the system may apply a filtering convolution, which is a matrix of real-valued numbers, to attempt to sharpen the image. This is due to such characteristics causing linear, unidirectional distortion of the subject matter within the image, which requires the lines of pixels to be collapsed along the direction of the stretch. The system may compute a convolution matrix based on the image and may use a learned mapping from the pixel positions and horizontal elongation in an image to the appropriate numerical array within the convolution matrix. The system may then multiply the pixel brightness values against the convolution matrix to produce a sharp image.

FIG. 1B shows objects and portions detected in an image. For example, after capturing an image of an object (e.g., textual information) on a mobile device and/or other content capture device, the system may perform post-processing to optimize the image before uploading it to a server. The system may use an algorithm that allows the system to apply padding (e.g., a scale factor) to the detected object (e.g., a rotated rectangle or other shape) in the image before rotation correction is applied. By applying the padding prior to the rotation correction, the system is more efficient as rotation correction may be performed simultaneously with other processing tasks such as cropping and downscaling. Accordingly, the overall system more efficiently processes the image. For example, by applying padding first, the system is able to keep rotation correction, cropping, and/or downscaling as a single step, which is quicker and more efficient.

Specifically, the system calculates a maximum scale factor (e.g., padding) that the rotated rectangle can expand while maintaining its aspect ratio before one of its corners encounters an edge of a portion of the image. As shown in FIG. 1B, the system has defined a rectangular border of object 152 and object 162 in image 150. The system has also identified portion 154 (e.g., corresponding to object 152) and portion 164 (e.g., corresponding to object 162). The system may determine the size and/or shape of a respective portion based on analysis of textual, non-textual, and/or background content (e.g., based on pixel values) for image 150.

FIG. 1C shows the determination of a scale factor. For example, to determine the scale factor, the system detects a rotated rectangle for object 174 (e.g., the bounds of the object) in image 170. The system also determines a center point for object 174 (e.g., center point 172). The system may also determine a current rotation angle (if any) as well as a size (e.g., width/height) of object 174. The system may then determine the size and/or bounds of a portion (e.g., portion 176) of the image corresponding to object 174. The system may then use the bounds (e.g., width/height) of portion 176 to calculate a percent change in the rotated rectangle's size (e.g., a "deltaSize") required for each of the X/Y coordinates of the corner points of object 174 (e.g., corner point 178) to reach the boundary of portion 176 (e.g., as defined by the edges of portion 176).

The system may calculate the deltaSize for the X/Y coordinates of the four corner points. The system may then select the minimum deltaSize value as the maximum scale factor that ensures all four corner points are within the image's bounds. When applying padding to object 174 (rotated rectangle), the system may select the scale factor (e.g., padding to be less than or equal to the maximum scale factor). For example, the system may determine a rotation angle (e.g., angle 184) corresponding to the rotation of object 174, when one or more of the corner points of object 174 meet the edges of portion 176 (e.g., as indicated at point 182).

By doing so, the system optimizes the amount of padding that may be applied. For example, when capturing images of an object (e.g., a government-issued ID) for identity verification on a mobile device, the system may need to crop the object out of the image with some percent of padding around the object in order to enhance document liveness detection.

A document liveness check verifies that the image is from a physical object and not an image of an image. The check works better when some background around the object is included in the image. When adding padding around the rotated object in the image, the system also needs to maintain the object's aspect ratio and stay within the bounds of the image so that the object is displayed properly on a user interface.

FIG. 2 shows an illustrative diagram of pseudocode for optimizing images before correcting rotations of the image objects, in accordance with one or more embodiments. Pseudocode 200 includes first code portion 202, which defines a plurality of variables. Pseudocode 200 includes second code portion 204, which relates to determining the four corners (e.g., of a rotated rectangle). Pseudocode 200 also includes third code portion 206, which relates to determining a maximum expansion.

For example, code portion 202 defines variables such as "angleradians," "a," "b," and "aspectratio" for a rotated rectangle. As shown in pseudocode 200, the rotated rectangle is defined by as a class as:

```
class RotatedRect {
    Point center;
    Size size;
    double angle;
}
```

Pseudocode 200 includes second code portion 204, which relates to determining the four corners (e.g., of a rotated rectangle). The four corners of the rotated rectangle are defined by as a class as:

```
b = (double) Math.cos(angle Radians) · 0.5f;
a = (double) Math.sin(angleRadians) · 0.5f;
bottomLeftPoint = new Point(
    center.x − a · size.height − b · size.width,
    center.y + b · size.height − a · size.width
);
topLeftPoint = new Point(
    center.x + a · size.height − b · size.width,
    center.y − b · size.height − a · size.width
);
topRightPoint = new Point(
    2 · center.x − pt[0].x,
    2 · center.y − pt[0].y
);
bottomRightPoint = new Point(
    2 · center.x − pt[1].x,
    2 · center.y − pt[1].y
);
```

Pseudocode 200 includes third code portion 206, which relates to determining a maximum expansion. As shown in third code portion 206, the aspect ratio and angle remain constant, and the system determines X/Y of each point that hits image bounds (e.g., edges of a portion) as size increases. For example, to find where bottomLeftPoint's X hits the left side of the image (x=0), the system determines:

$$bottomLeftPointX = center.x - a \cdot size.height - b \cdot size.width$$

The system then defines a new constant "aspectRatio," which equals size.width/size.height. This means that size.width=aspectRatio·size.height so the formula above can be updated to:

$$bottomLeftPointX = center.x - a \cdot size.height - b \cdot aspectRatio \cdot size.height$$

The system sets bottomLeftPointX to zero and solves for size.height to find how much the height can expand before it hits the left image bounds:

$$0 = center.x - a \cdot size.height - b \cdot aspectRatio \cdot size.height$$

$$center.x = a \cdot size.height + b \cdot aspectRatio \cdot size.height$$

$$center.x/size.height = a + b \cdot aspectRatio$$

$$1/size.height = (a + b \cdot aspectRatio)/center.x$$

$$size.height = center.x/(a + b \cdot aspectRatio)$$

The system repeats for each corner point's X/Y coordinates, which will result in 8 size.height values. The minimum size.height value is the maximum height that the system can expand the object (e.g., "rotatedRect") before it corresponds to the image's bounds.

Figure 3:
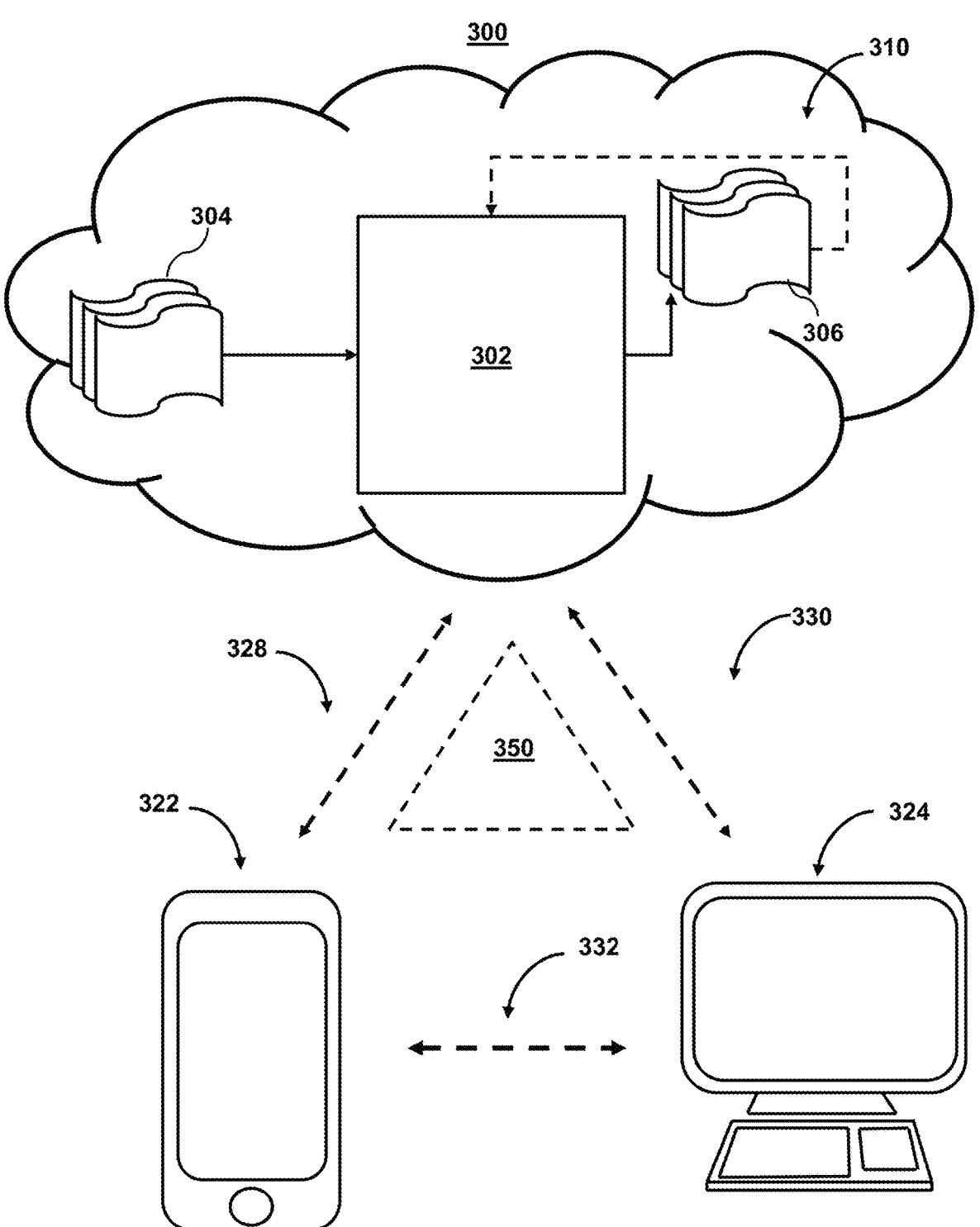
FIG. 3 shows illustrative components for a system used to optimize images before correcting rotations of the image objects, in accordance with one or more embodiments.

FIG. 3 shows illustrative components for a system used to optimize images before correcting rotations of the image objects, in accordance with one or more embodiments. For example, FIG. 3 may show illustrative components for receiving images from a user, requesting additional images from the user, or displaying options for image processing tasks to the user. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program).

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior transactions. Alternatively, or additionally, the system may act as a clearinghouse for multiple sources of information about the user. Cloud components 310 may also include control circuitry configured to perform the various operations needed to generate interactive responses. For example, the cloud components 310 may include cloud-based storage circuitry configured to store a first model that is trained to identify and locate blurs, and classify the blurs among known error types. The cloud components 310 may include cloud-based storage circuitry configured to store a second model that is trained to apply geometric corrections on the inputted images. Cloud components 310 may also include cloud-based control circuitry configured to apply filtering to portions of images. Cloud components 310 may also include cloud-based I/O circuitry configured to send and receive communications to and from the user.

Cloud components 310 may include model 302, which may be a model, artificial intelligence model, etc. Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled model input, wherein the first labeled model input is labeled with a known prediction for the first labeled model input. The system may then train the first model to classify the first labeled model input with the known prediction (e.g., distinguishing among a plurality of error types).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether a given input corresponds to a classification of model 302.

In some embodiments, the model (e.g., model 302) may automatically perform actions based on outputs 306. In some embodiments, the model (e.g., model 302) may not perform any actions. The output of the model (e.g., model 302) may be used to determine whether the first image has a first object and whether the first object is located at the textual information. The output of the model (e.g., model 302) may include selection of the first image processing task from a plurality of image processing tasks.

System 300 also includes API layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDOS protection, and API layer 350 may use RESTful APIs as standard for external integration.

Figure 4:
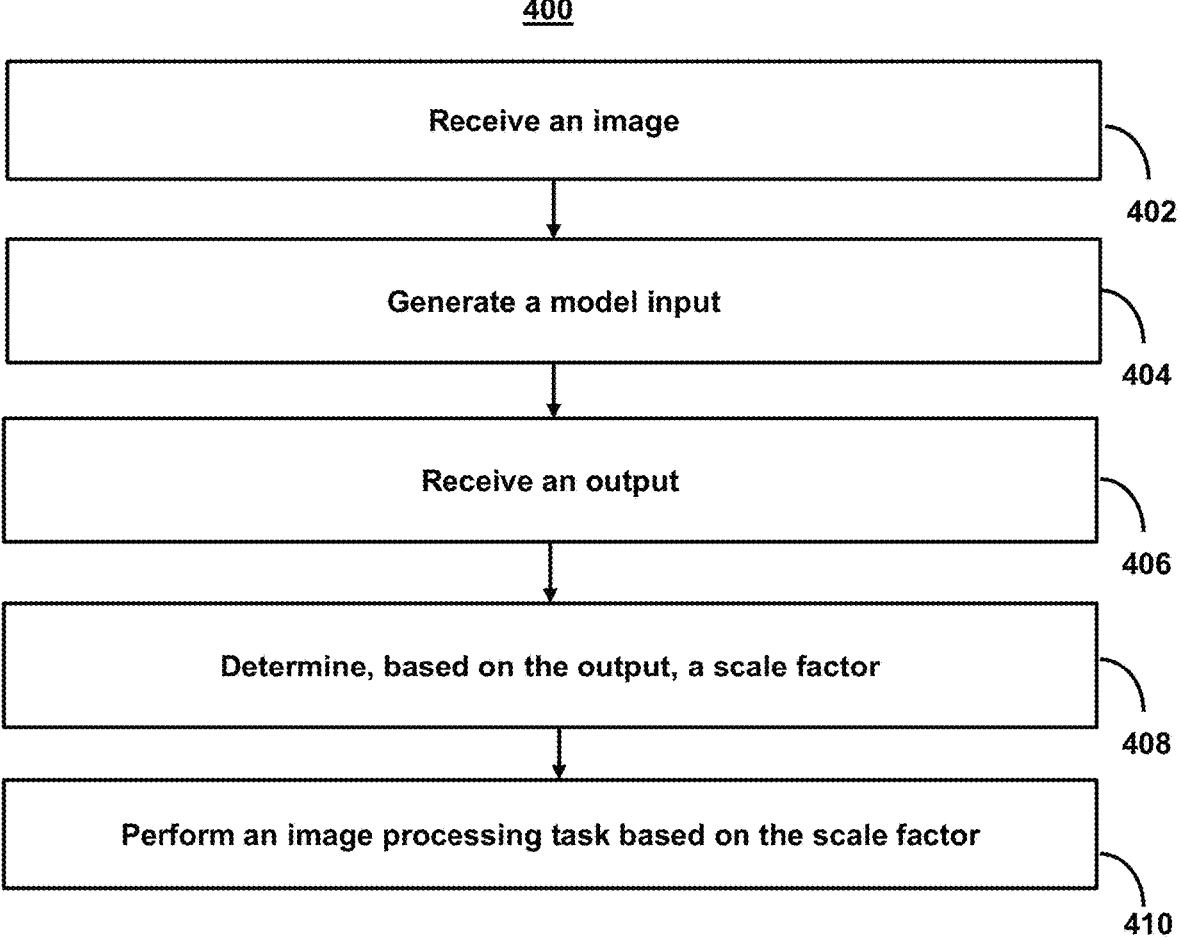
FIG. 4 shows a flowchart of the steps involved in applying scale factors to image objects received as part of user communications before correcting rotations of the image objects, in accordance with one or more embodiments.

FIG. 4 shows a flowchart of the steps involved in applying scale factors to image objects received as part of user communications before correcting rotations of the image objects, in accordance with one or more embodiments. For example, the system may use process 400 (e.g., as implemented on one or more system components described above) in order to efficiently optimize an image before uploading it to a server. For example, after receiving an image of an object on a mobile device, the system may perform post-processing to optimize the image before performing further image processing tasks. The system may use an algorithm to apply a scale factor (e.g., padding) to a detected object (e.g., rotated rectangle) in the image before rotation correction is applied. This is needed to keep processing efficient since rotation correction, cropping, and/or downscaling are performed in a single step in libraries related to computer vision, image processing, and machine learning.

At step 402, process 400 (e.g., using one or more components in system 300 (FIG. 3)) receives an image. For example, the system may receive, from a first user, a first user communication comprising a first image, wherein the first image comprises a first object within a first portion of the first image.

In some embodiments, the first object may comprise textual or non-textual information. For example, the object may comprise a discrete and tangible thing that exists in the physical world and can be perceived by the senses. Objects can have different properties, such as size, shape, color, texture, and weight, which distinguish them from one another. In some embodiments, an object may be a computer object, which may comprise a specific instance of a class, which is a blueprint or template defining the characteristics and behaviors of a particular type of object.

In some embodiments (e.g., in the context of image processing and computer vision), an object in an image (e.g., a user communication) may refer to a specific entity or region of interest that is distinguishable from its surroundings. It may represent a meaningful and coherent part of the visual content within the image. Objects in images can vary in size, shape, color, texture, and/or other identifying characteristics. They can be everyday objects like cars, buildings, or animals, or they can represent more abstract concepts like lines, curves, or patterns. The recognition and identification of objects in images are fundamental tasks in computer vision, with numerous applications such as object detection, object tracking, and image classification. In particular, the system may use object detection algorithms and frameworks, such as Faster R-CNN, YOLO, and SSD, to automate the process of identifying and localizing objects in images, enabling applications like autonomous driving, surveillance, and image-based search.

In such cases, the first image may comprise first textual information and first non-textual information, wherein the first textual information comprises one or more alphanumeric characters, and wherein the first non-textual information comprises one or more graphical elements. For example, the system may receive a check that a user wishes to deposit, or a proof-of-identification document requested from a client. By doing so, the system offers users a convenient and secure method of providing possibly sensitive information.

At step 404, process 400 (e.g., using one or more components in system 300 (FIG. 3)) generates a model input. For example, the system may generate a first model input based on the first user communication. A model input may be a numerical vector or matrix representing information contained within an image. For example, an image that is 100 by 100 pixels, each pixel with its own brightness and color, may be translated into a model input comprising a 100 by 100 matrix, each entry in which is a number encoding the brightness and color of its corresponding pixel.

In some embodiments, the model input may be the data or information that is provided as input to the model for making predictions and/or performing tasks. The model input may comprise one or more features. Features are specific attributes or characteristics (e.g., identifying characteristics) of the input data that are believed to be relevant or informative for the model to learn from. The process of selecting and engineering appropriate features is often referred to as feature engineering. It involves analyzing the raw input data, identifying relevant patterns or attributes, and transforming or encoding them into a format that the model can effectively use and/or learn from. For example, features could be pixel values, color histograms, texture descriptors, and/or activations from pre-trained CNNs.

In some embodiments, the system may determine a type of the first image. The system may retrieve a template for the type, wherein the template indicates relevant textual information. By doing so, the system can access information from previous encounters with similar images and instruct the first model more precisely.

In some embodiments, the system may determine a first portion of the first image comprising the first textual information and a second portion comprising the first non-textual information. For example, a bank check may contain a logo, which is a second portion, and routing numbers, account numbers, recipients, and other text, which is a first portion. The system may find the pixel positions of the first portion and the second portion and may use a template for bank checks to assist in finding the positions. The system may determine objects within the first portion and apply filtering to the second portion. The above actions, which the system may perform, may generate data that may be included in the first model input. By doing so, the system provides a comprehensive assessment of the image so that a model may more effectively identify any flaws therein.

At step 406, process 400 (e.g., using one or more components in system 300 (FIG. 3)) receives an output. For example, the system may input the first model input into a first model to receive a first output, wherein the first model is trained to determine respective scale factors, prior to applying rotation correction, for objects of inputted images in portions of the inputted images. The system may determine numerous identifying characteristics in an image. For example, the system may determine identifying characteristics such as a center point of the first object, a rotation angle of the first object, a size of the first object, and/or edge locations of the first portion.

This process may be referred to as optical document recognition. In some embodiments, the system inputs the first model input into a first model, wherein the first model is trained to determine respective scale factors, prior to applying rotation correction, for objects of inputted images and determine whether the objects are located in portions of the inputted images. By doing so, the system may pinpoint the cause and nature of any problems within the image.

In some embodiments, when determining, based on the first output, the first scale factor for the first object, the system may determine respective percent changes in the size of the first object for each of the plurality of corner points to correspond to the edge locations. The system may select a minimum percent change from the respective percent changes. The system may determine the first scale factor based on the minimum percent change.

In some embodiments, the system may determine a first error type, of a plurality of error types, affecting the first image. For example, the system may recognize that the blur was caused by camera movement during capture. For example, the system may determine various error types for a given image. By doing so, the system may select specific image processing tasks (e.g., stitching together images, requesting replacement images, etc.).

In some embodiments, the system may use grayscale ratios, a type of identifying characteristic, to identify error types. For example, the system may extract from the first image a first grayscale ratio and compare the first grayscale ratio against a pre-trained threshold to identify the first error type among the plurality of error types. In such cases, the system may determine a grayscale ratio of an inputted image of a check. By doing so, the system may generate a better contrast on the image to more easily detect objects.

At step 408, process 400 (e.g., using one or more components in system 300 (FIG. 3)) determines, based on the output, a scale factor. For example, the system may determine, based on the first output, a first scale factor for the first object, wherein the first scale factor comprises a maximum expansion of the first object while maintaining a first aspect ratio before a first corner point of a plurality of corner points of the first object corresponds to a first edge of a plurality of edges of the first portion.

In some embodiments, the system may receive a determination, based on the first output, of a first scale factor for the first object. The system may receive from the first model the selection of the first image processing task from a plurality of image processing tasks. For example, the system may receive instructions to stitch two images together to create a clear picture. By doing so, the system may communicate to the user its intent to perform correction and the problem it attempts to address, thus providing transparency.

At step 410, process 400 (e.g., using one or more components in system 300 (FIG. 3)) performs a first image processing task based on the scale factor. For example, in response to determining the first scale factor, the system may perform a first image processing task on the first image based on the first scale factor. In some embodiments, the system may, in response to determining the first scale factor, perform a first image processing task on the first image based on the first scale factor. The system may generate a first option for the first image processing task and a second option for a second image processing task and receive a user selection of the first option. The system may, in response to receiving the user selection of the first option, select to perform the first image processing task. By doing so, the system may ensure that any action it performs on the user communication is transparent and accountable.

In some embodiments, the system may also generate a request to the first user for a second communication comprising an additional image comprising the first textual information and the first non-textual information. By doing so, the system has a high chance of successfully reconstructing a high-quality image.

In some embodiments, the system may support various geometric transformations like scaling, rotation, translation, and perspective transformation. The system may use these transformations for tasks such as image registration, alignment, and augmentation. For example, the system may retrieve a second model, wherein the second model is trained to apply geometric corrections on the inputted images. The system may then process the first image using the second model.

In some embodiments, the system may provide a range of filtering operations, including blurring, sharpening, noise reduction, and edge detection. The system may use these operations to enhance image quality or extract specific features. For example, the system may retrieve a second model, wherein the second model is trained to apply filtering corrections on the inputted images. The system may then process the first image using the second model.

In some embodiments, the system may provide functions for automatic or manual thresholding, allowing the system to convert grayscale images to binary images based on specific intensity thresholds. For example, the system may retrieve a second model, wherein the second model is trained to apply thresholding corrections on the inputted images. The system may then process the first image using the second model.

In some embodiments, the system may include algorithms for detecting and extracting features, such as corners, edges, blobs, and/or keypoints, in images. The system may use these features for tasks like object recognition, tracking, and/or matching. For example, the system may retrieve a second model, wherein the second model is trained to apply feature extraction on the inputted images. The system may then process the first image using the second model.

In some embodiments, the system may support a wide range of geometric and/or projective transformations, enabling operations like image warping, perspective correction, and/or image stitching. For example, the system may retrieve a second model, wherein the second model is trained to apply projective transformations on the inputted images. The system may then process the first image using the second model.

In some embodiments, the system may access a library used for image and video processing tasks. The library may provide a comprehensive set of functions and algorithms for image manipulation, analysis, and computer vision applications. For example, the system may access an image processing library. The system may then select a set of functions from the image processing library for performing the first image processing task.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for applying scale factors to image objects received as part of user communications before correcting rotations of the image objects.

2. The method of the preceding embodiment, further comprising: receiving, from a first user, a first user communication comprising a first image, wherein the first image comprises a first object within a first portion of the first image; generating a first model input based on the first user communication; inputting the first model input into a first model to receive a first output, wherein the first model is trained to determine respective scale factors, prior to applying rotation correction, for objects of inputted images in portions of the inputted images; determining, based on the first output, a first scale factor for the first object, wherein the first scale factor comprises a maximum expansion of the first object while maintaining a first aspect ratio before a first corner point of a plurality of corner points of the first object corresponds to a first edge of a plurality of edges of the first portion; and in response to determining the first scale factor, performing a first image processing task on the first image based on the first scale factor.

3. The method of any one of the preceding embodiments, wherein the first model input comprises: a center point of the first object; a rotation angle of the first object; a size of the first object; and edge locations of the first portion.

4. The method of any one of the preceding embodiments, wherein determining, based on the first output, the first scale factor for the first object further comprises: determining respective percent changes in the size of the first object for each of the plurality of corner points to correspond to the edge locations; selecting a minimum percent change from the respective percent changes; and determining the first scale factor based on the minimum percent change.

5. The method of any one of the preceding embodiments, further comprising: determining a first error type of a plurality of error types affecting the first image; and selecting, based on the first error type, the first image processing task from a plurality of image processing tasks.

6. The method of any one of the preceding embodiments, further comprising: extracting from the first image a first grayscale ratio; and comparing the first grayscale ratio against a pre-trained threshold to identify the first error type among the plurality of error types.

7. The method of any one of the preceding embodiments, wherein performing the first image processing task comprises: retrieving a second model, wherein the second model is trained to apply geometric corrections on the inputted images; and processing the first image using the second model.

8. The method of any one of the preceding embodiments, wherein performing the first image processing task comprises: retrieving a second model, wherein the second model is trained to apply filtering corrections on the inputted images; and processing the first image using the second model.

9. The method of any one of the preceding embodiments, wherein performing the first image processing task comprises: retrieving a second model, wherein the second model is trained to apply thresholding corrections on the inputted images; and processing the first image using the second model.

10. The method of any one of the preceding embodiments, wherein performing the first image processing task comprises: retrieving a second model, wherein the second model is trained to apply feature extraction on the inputted images; and processing the first image using the second model.

11. The method of any one of the preceding embodiments, wherein performing the first image processing task comprises: retrieving a second model, wherein the second model is trained to apply projective transformations on the inputted images; and processing the first image using the second model.

12. The method of any one of the preceding embodiments, wherein performing the first image processing task comprises: accessing an image processing library; and selecting a set of functions from the image processing library for performing the first image processing task.

13. The method of any one of the preceding embodiments, wherein performing the first image processing task comprises: generating a request to the first user for a second communication comprising an additional image comprising the first object.

14. The method of any one of the preceding embodiments, wherein generating the first model input based on the first user communication further comprises: determining a second portion of the first image comprising non-textual information; and filtering the second portion of the first image.

15. The method of any one of the preceding embodiments, wherein generating the first model input based on the first user communication further comprises: determining a type of the first image; retrieving a template for the type, wherein the template indicates relevant textual information; and determining the first portion based on the template.

16. The method of any one of the preceding embodiments, wherein performing the first image processing task on the first image based on the first scale factor further comprises: generating a first option for the first image processing task and a second option for a second image processing task; receiving a user selection of the first option; and in response to receiving the user selection of the first option, selecting to perform the first image processing task.

17. A tangible, non-transitory, machine-readable medium storing instructions that, when executed by a data processing apparatus, cause the data processing apparatus to perform operations comprising those of any of embodiments 1-16.

18. A system comprising one or more processors; and memory storing instructions that, when executed by the processors, cause the processors to effectuate operations comprising those of any of embodiments 1-16.

19. A system comprising means for performing any of embodiments 1-16.

What is claimed is:

1. A system for applying scale factors to image objects during a document liveness check before correcting rotations of the image objects, the system comprising:
one or more processors; and
one or more non-transitory, computer-readable media comprising instructions that, when executed by the one or more processors, cause operations comprising:

receiving, from a first user, a first user communication comprising a first image, wherein the first image comprises a first object within a first portion of the first image;
determining a center point of the first object;
determining a rotation angle of the first object;
determining a size of the first object;
determining edge locations of the first portion;
determining, prior to applying rotation correction, respective percent changes in the size of the first object for each of a plurality of corner points to correspond to a first edge location of the first portion;
selecting a minimum percent change from the respective percent changes;
determining a first scale factor based on the minimum percent change;
performing, based on the first scale factor, an image processing task on the first image to generate a processed first image; and
applying one or more geometric corrections, comprising at least one rotation correction, to the processed first image.

2. A method for applying scale factors to image objects received as part of user communications, the method comprising:
receiving, from a first user, a first user communication comprising a first image, wherein the first image comprises a first object within a first portion of the first image;
generating a first model input based on the first user communication;
inputting the first model input into a first model to receive a first output, wherein the first model is trained to determine respective scale factors for objects of inputted images in portions of the inputted images;
determining, based on the first output, a first scale factor for the first object, wherein the first scale factor comprises a maximum expansion of the first object while maintaining a first aspect ratio before a first corner point of a plurality of corner points of the first object corresponds to a first edge of a plurality of edges of the first portion; and
performing, based on the first scale factor, a first image processing task on the first image using a second model trained to apply geometric correction, filtering correction, thresholding correction, feature extraction, or projective transformation on the inputted images.

3. The method of claim 2, wherein the first model input comprises:
a center point of the first object;
a rotation angle of the first object;
a size of the first object; and
edge locations of the first portion.

4. The method of claim 3, wherein determining, based on the first output, the first scale factor for the first object further comprises:
determining respective percent changes in the size of the first object for each of the plurality of corner points to correspond to the edge locations;
selecting a minimum percent change from the respective percent changes; and
determining the first scale factor based on the minimum percent change.

5. The method of claim 2, further comprising:
determining a first error type of a plurality of error types affecting the first image; and selecting, based on the first error type, the first image processing task from a plurality of image processing tasks.

6. The method of claim 5, further comprising:

extracting from the first image a first grayscale ratio; and comparing the first grayscale ratio against a pre-trained threshold to identify the first error type among the plurality of error types.

7. The method of claim 2, wherein performing the first image processing task comprises:

retrieving a second model, wherein the second model is trained to apply geometric corrections on the inputted images; and processing the first image using the second model.

8. The method of claim 2, wherein performing the first image processing task comprises:

retrieving the second model, wherein the second model is trained to apply filtering corrections on the inputted images; and processing the first image using the second model.

9. The method of claim 2, wherein performing the first image processing task comprises:

retrieving the second model, wherein the second model is trained to apply thresholding corrections on the inputted images; and processing the first image using the second model.

10. The method of claim 2, wherein performing the first image processing task comprises:

retrieving the second model, wherein the second model is trained to apply feature extraction on the inputted images; and processing the first image using the second model.

11. The method of claim 2, wherein performing the first image processing task comprises:

retrieving the second model, wherein the second model is trained to apply projective transformations on the inputted images; and processing the first image using the second model.

12. The method of claim 2, wherein performing the first image processing task comprises:

accessing an image processing library; and selecting a set of functions from the image processing library for performing the first image processing task.

13. The method of claim 2, wherein performing the first image processing task comprises:

generating a request to the first user for a second communication comprising an additional image comprising the first object.

14. The method of claim 2, wherein generating the first model input based on the first user communication further comprises:

determining a second portion of the first image comprising non-textual information; and filtering the second portion of the first image.

15. The method of claim 2, wherein generating the first model input based on the first user communication further comprises:

determining a type of the first image;

retrieving a template for the type, wherein the template indicates relevant textual information; and determining the first portion based on the template.

16. The method of claim 2, wherein performing the first image processing task on the first image based on the first scale factor further comprises:

generating a first option for the first image processing task and a second option for a second image processing task;

receiving a user selection of the first option; and in response to receiving the user selection of the first option, selecting to perform the first image processing task.

17. One or more non-transitory, computer-readable media comprising instructions that, when executed by one or more processors, cause operations comprising:

receiving, from a first user, a first user communication comprising a first image, wherein the first image comprises a first object within a first portion of the first image;

generating a first model input based on the first user communication;

inputting the first model input into a first model to receive a first output, wherein the first model is trained to determine respective scale factors for objects of inputted images in portions of the inputted images;

determining, based on the first output, a first scale factor for the first object, wherein the first scale factor comprises a maximum expansion of the first object while maintaining a first aspect ratio before a first corner point of a plurality of corner points of the first object corresponds to a first edge of a plurality of edges of the first portion; and in response to determining the first scale factor, performing a first image processing task on the first image based on the first scale factor, wherein performing the first image processing task comprises:

accessing an image processing library; and selecting a set of functions from the image processing library for performing the first image processing task.

18. The one or more non-transitory, computer-readable media of claim 17, wherein the first model input comprises:

a center point of the first object;

a rotation angle of the first object;

a size of the first object; and edge locations of the first portion.

19. The one or more non-transitory, computer-readable media of claim 18, wherein determining, based on the first output, the first scale factor for the first object further comprises:

determining respective percent changes in the size of the first object for each of the plurality of corner points to correspond to the edge locations;

selecting a minimum percent change from the respective percent changes; and determining the first scale factor based on the minimum percent change.

20. The one or more non-transitory, computer-readable media of claim 17, wherein the instructions further cause operations comprising:

determining a first error type of a plurality of error types affecting the first image; and selecting, based on the first error type, the first image processing task from a plurality of image processing tasks.

* * * * *